United States Patent Office 2,855,950
Patented Oct. 14, 1958

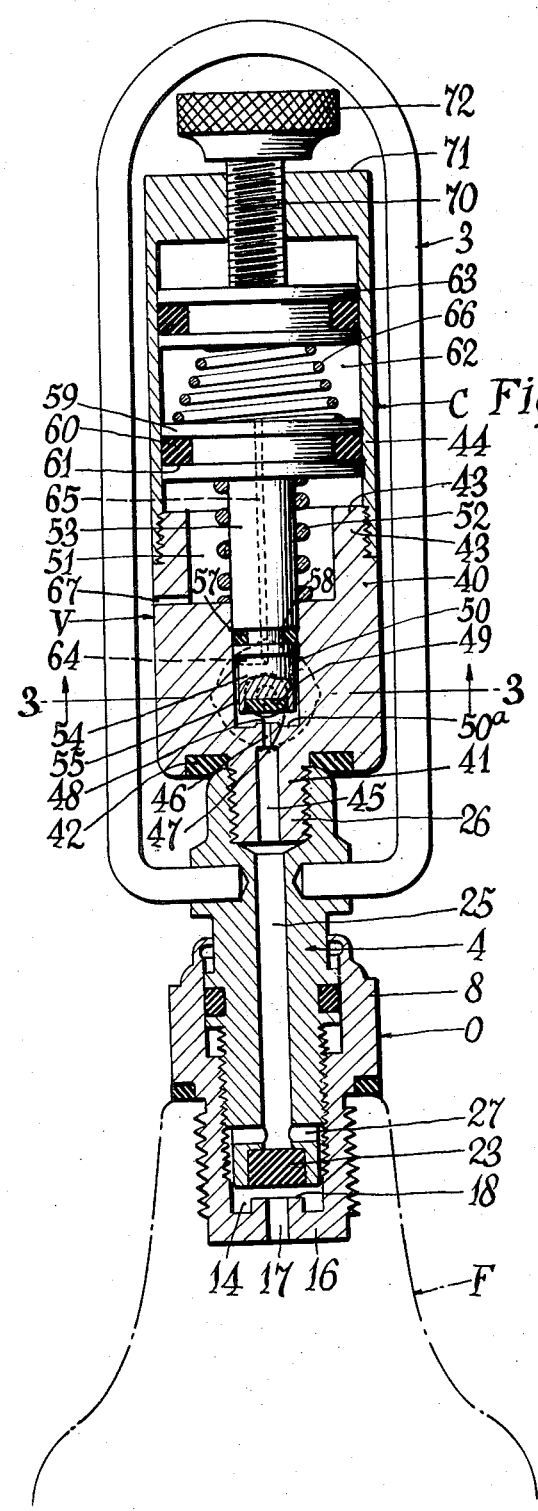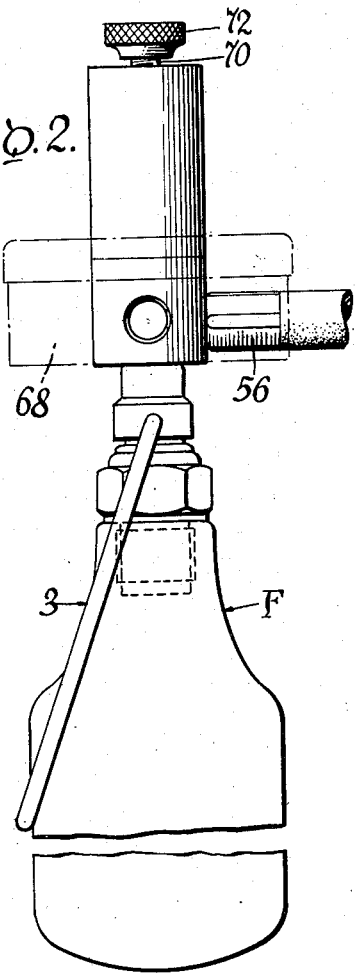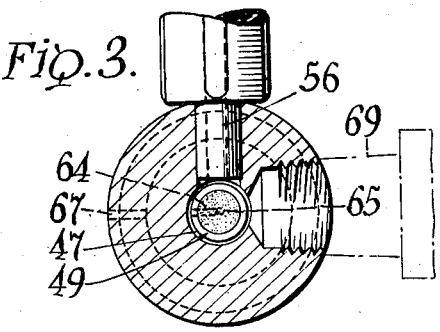

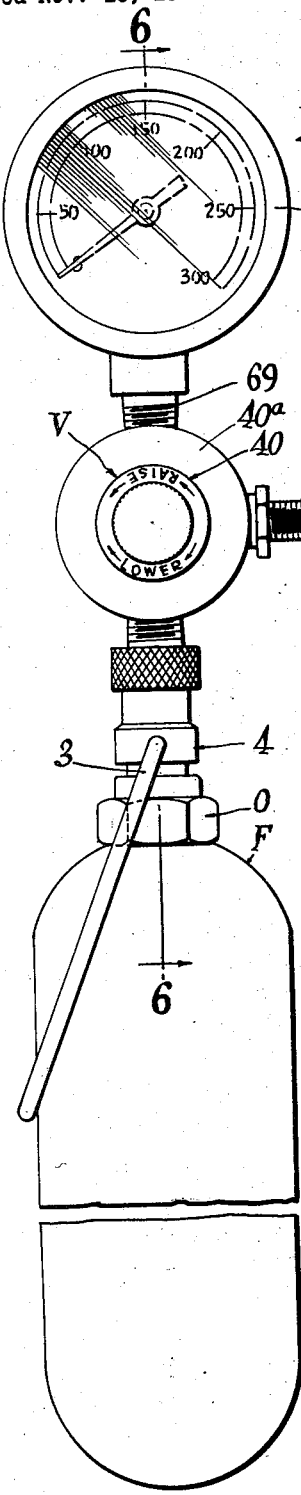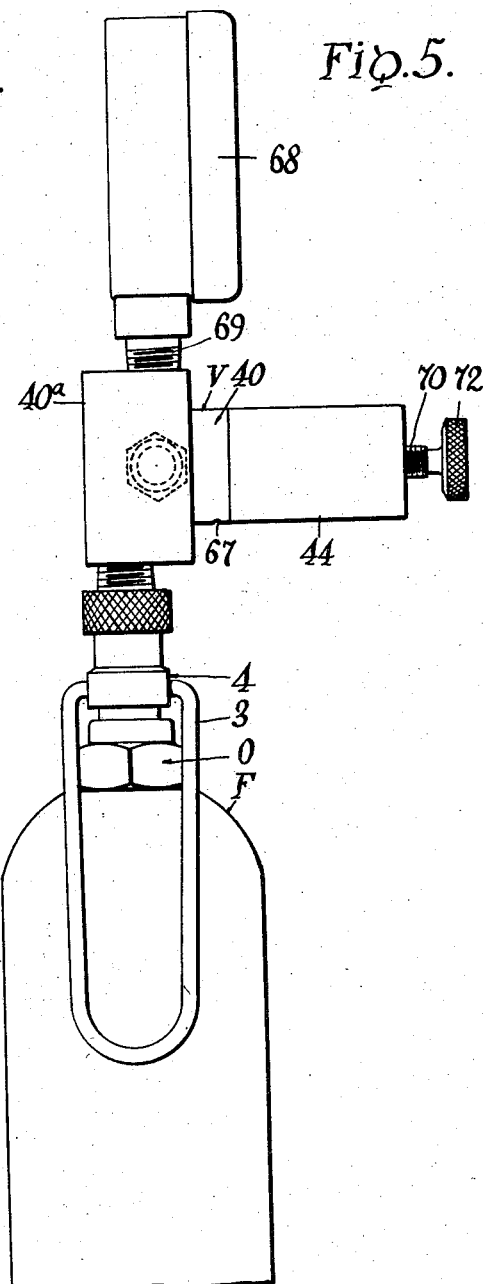

2,855,950

PRESSURE REDUCING AND REGULATING VALVES FOR USE IN ASSOCIATION WITH CONTAINERS FOR GASES UNDER HIGH PRESSURES

Robert Roy Phillips, North Tonawanda, N. Y.

Application November 19, 1954, Serial No. 469,920

2 Claims. (Cl. 137—505.28)

This invention relates to improvements in pressure reducing and regulating valves for use in association with containers for gases under high pressures. The pressures required by the operating apparatus or devices, which may be called the "utilization" pressures, may vary within a wide range, according to the particular purposes of utility, and may also vary within a wide range of ratios in relation to the "supply" pressure which varies for different gases and is always many times higher than the utilization pressure. Merely for example, let it be assumed that the gas is carbon dioxide compressed to liquid form and at room temperature under a substantially constant supply pressure of 800 p. s. i.; the uses of carbon dioxide under such pressure are manifold and involve various utilization pressures. Thus where the gas is to be used for carbonization the pressure usually ranges from 100 to 150 p. s. i. and where the gas is to be used for spray gun and air brush work it is usually only about 25 or 35 p. s. i.

Various pressure reducing and regulating valves are available and are characterized by diaphragms which in most instances are composed of flexible rubber and in some instances are composed of very thin sheets of copper with concentric volutions which in alternate relation project above and below the plane of the diaphragm. These prior valves, as known to me, have a number of substantial objections. They are unduly expensive to manufacture. The diaphragms tend to crystallize after a period of time. The rubber diaphragms, from a chemical standpoint, may be adversely affected by particular gases. At the start of the operation of the apparatus the pressure from the source, if suddenly applied, may tend to disrupt the diaphragm. Repairs involving the substitution of new diaphragms for diaphragms which have become inoperative or inaccurate in operation are very costly and for this reason in many instances are not attempted, an entirely new valve being substituted.

The invention is addressed to overcoming the above noted objections. Its objects are to provide a pressure reducing and regulating valve in which diaphragms are eliminated; which has sensitivity in the regulation of the utilization pressure through a range of degrees and at a minimum degree comparable to the minimum degree of regulated pressure heretofore achieved, this regardless of the pressure at the source; in which the only rubber elements are the sealing rings which are preferably of the Christensen type (Patent No. 2,180,795 of November 21, 1939), these being substantially occluded from the gases and in the event of deterioration being readily and economically replaceable; which is not subject to derangement by suddenly applied pressure from the source; in which the regulation of the utilization pressure is effected by an externally located, immediately accessible part; and which is extremely simple in construction and economical to manufacture and repair.

The objects above stated are served by a novel combination of cooperating elements. In a general way these are an enclosing casing; a pressure operated valve at an end of a valve stem coaxial with the casing as an element for the immediate control of the delivery of the gas to the utilization point and which is moved to open position by the pressure within the container with the supplement of a compression type loading spring, the valve operating within an inlet chamber provided by the casing; a back pressure chamber having an enclosing wall provided by the casing and having opposed relatively movable walls coaxial with the valve stem, one provided by an element positionally adjustable within the casing in the direction of the axis of the valve stem, the back pressure chamber in the open position of the valve being supplied through an appropriate passage in communication with the inlet chamber with gas at the same pressure as that, according to the particular pressure regulation, at which the gas is delivered to the point of utilization; sealing means carried by the opposed walls of the back pressure chamber and cooperating with the internal wall of the casing, thereby to prevent the escape of gas from the back pressure chamber and the escape of gas into the back pressure chamber except through the aforesaid passage; a pressure regulating spring within the compression type pressure chamber which acts in opposition to the loading spring; and means, for example a screw, for the adjustment of the positionally adjustable wall of the back pressure chamber, the adjusting means being accessible externally of the casing and serving to move the positionally adjustable wall toward or from the piston of the valve stem and thereby to increase or decrease the pressure imposed by the spring within the back pressure chamber upon the piston of the valve stem and correspondingly to decrease or increase the pressure required to be applied by the gas upon the piston of the valve stem.

It will, of course, be understood that the container for the gas may be of any of the forms now in use for industrial or other purposes and that it is provided with a gas discharge nipple and with a normally closed valve, the pressure reducing and regulating valve of the invention being connected to the discharge nipple.

Merely for example, the container is shown in the drawings in its simplest form, namely as a standard flask which has a discharge nipple and a normally closed valve, the construction shown and preferred being that which is described in detail in the patent to O. S. Phillips No. 2,525,617 issued October 10, 1950. As used in connection with flasks the invention is shown in two forms which are merely colorably variant. In one form the valve of the invention is mounted in coaxial relation to the flask. In the second form the valve is mounted in laterally projecting relation.

In the drawings:

Figure 1 is a vertical sectional view showing the discharge nipple and the associated valve for the normal closure of the flask with the valve of the invention secured to the discharge nipple in a position in which it is in axial alinement with the flask.

Figure 2 is an elevation of the flask with the valve of the invention attached in the relation shown in Figure 1.

Figure 3 is a horizontal sectional view on the line 3—3 of Figure 1, looking in the direction of the arrows.

Figure 4 is an elevation showing the ensemble of the flask and the valve of the invention in which the valve is mounted in laterally projecting relation.

Figure 5 is an elevation showing the same ensemble as viewed when turned at an angle of 90° to the elevation shown in Figure 4.

Figure 6:
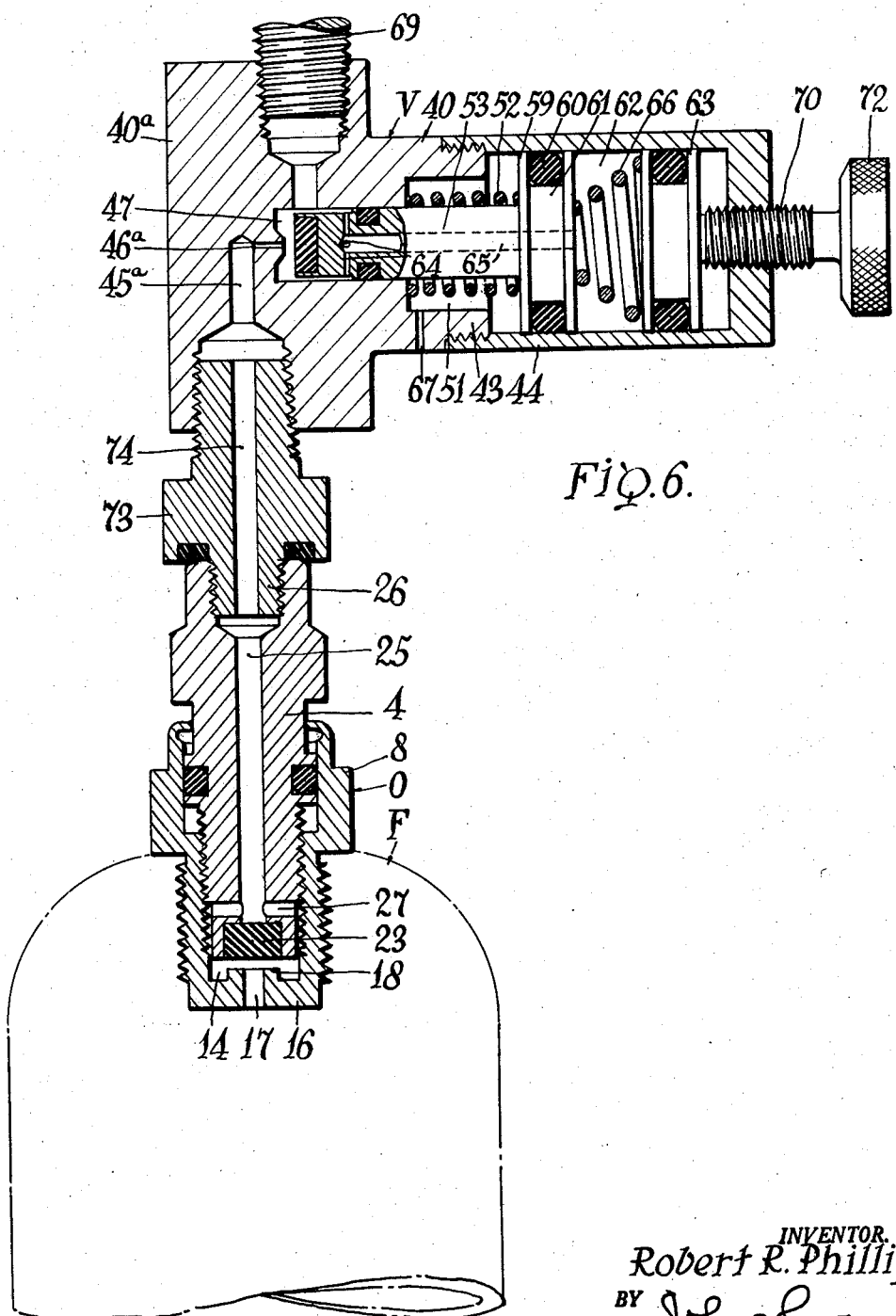
Figure 6 is a vertical sectional view on the line 6—6 of Figure 4.

The flask F exemplifies the container for the gas and carries at its discharge end a valve organization designated generally as O which is preferably of the construction shown in the patent to O. S. Phillips 2,525,617 issued October 10, 1950. This construction includes a sealing body 23 at the inner end of a valve stem 4, the valve stem having threaded engagement in a casing 8. The sealing body 23 cooperates with a seat 18 formed on the bottom wall 16 of the casing 8, the wall 16 having a central axial passage 17 which communicates with the interior of the flask and with the chamber 14 in which the sealing body 23 is movable. The valve stem 4 has an outer internally threaded terminal nipple 26 and beyond the sealing body 23 is formed with radial passages 27 in communication with the chamber 14 and with an axial passage 25 which extends to the nipple 26. The valve stem 4 in the part thereof which projects beyond the flask F carries a pivoted bail 3 which may be raised and lowered and as raised may be used as a handle to turn the valve stem in directions to move the sealing body 23 to open or closed position. In Figure 1 the sealing body 23 is shown as in its open position whereby the gas under pressure in the flask F flows through the passage 17, chamber 14, the radial passages 27 and the axial passage 25 to the nipple 26.

Referring to Figures 1, 2 and 3:

The valve of the invention is indicated generally at V and in these figures is shown as arranged coaxially with the flask F. The valve V includes a part 40 which may be called the body part and which at its inner end is formed with an externally threaded projection 41 having tapped engagement in the nipple 26, the body 40 having it under face recessed to accommodate a sealing gasket 42 which bears against the edge face of the nipple 26.

The body 40 at its outer end portion 43 is of slightly reduced diameter and formed with external threads which serve for the attachment of a shell 44 arranged in coaxial relation to the flask F, the shell having a cylindrical wall and an outer end wall and as connected to the body 40 constituting a valve casing C of which the body 40 provides the inner end wall. The projection 41 is formed with an axial passage 45 which communicates with the passage 25. The body 40 is formed with an axial opening 50 which extends to its outer face from a web or base wall 50a in overhanging relation to the passage 45. The web 50a is provided with an axial passage 46 in communication with the passage 45 and is formed with a raised annular valve seat 48 concentric to the passage 46 and cooperating with a valve 49 constituted by a sealing body of disc form and of any suitable material. The valve 49 is provided at the inner end of an axially movable stem 53 for which the opening 50 provides a guide. The valve 49 operates in an inlet chamber 47 which is provided by the inner or lower portion of the opening 50. The upper portion of the body 40 is formed with a countersunk recess 51 concentric with and open to the opening 50 and of suitably greater diameter, the recess 51 providing a chamber for a helically coiled expansion spring 52.

The inner or lower portion 54 of the valve stem 53 which carries the valve 49 provides a wall of an annular clearance passage 55 which forms a part of the inlet chamber 47 and is otherwise defined by the circular wall of the opening 50. In the construction preferred the portion 54 of the stem 53 is of reduced diameter. The passage 55 communicates with a laterally projecting outlet nipple 56. The valve stem 53 operates in sealed relation to the wall of the opening 50, the seal preferably being provided by a packing ring 57 of the type shown in the Christensen Patent No. 2,180,795 of November 21, 1939. The valve stem 53 is formed with an annular channel 58 in which the packing ring 57 is fitted, the ring being in closely adjoining relationship to the upper and lower walls of the channel and bearing with effective sealing pressure against the annular base of the channel and the wall of the opening 50. The valve stem 53 is provided at its upper end with an enlarged head 59 which functions as a piston and cooperates with the casing C as a cylinder. The head 59 is movable axially in either direction and is in sealed relation to the casing C, the seal being a packing ring 60 which is preferably of the Christensen type and which is fitted in an annular channel 61 in the head 59 in the same way that sealing ring 57 is fitted in the channel 58.

The piston 59 provides a movable wall of a back pressure chamber 62 which is completed by a positionally adjustable element 63 similar in construction to the piston 59, and in a plane parallel to the plane of the piston 59, this element constituting an opposing companion adjustably movable wall of the pressure chamber 62 and being similarly in sealed relation to the casing C which, of course, provides the circular enclosing wall of the chamber 62. The valve stem 53 is formed in its inner or lower portion 54 of reduced diameter with a lateral passage 64 which is in open communication with the clearance passage 55 and also with an axial passage 65 extending from the passage 64 through the valve stem and through the piston 59, the passage 64 and 65 being shown in broken lines. By reason of the passages 64 and 65, when the valve 49 is in open position gas will flow into the chamber 62 where it will build up to the pressure predetermined by the adjustment of the position of the wall 63, this being the same as the predetermined utilization pressure. The chamber 62 encloses a spring 66 of the helical expansion type which bears with pressure effect upon the piston 59 and reacts against the companion opposing wall 63.

The piston 59 is responsive in movement to the greater of the pressures as applied to its opposite faces. Free movement of the piston 59 and of the valve stem 53 is provided for by a breather passage 67 formed in the annular wall of the recess 51 and which is open to the recess and to atmosphere.

The predetermined degree of the utilization pressure is indicated by a standard pressure gage shown in Figure 2 by broken lines at 68, which is connected to a nipple 69 projecting laterally from the casing and in open communication with the inlet chamber 47.

The utilization pressure at a reduced degree is predetermined by the positional adjustment of the wall element 63. The means for effecting such adjustment preferably consists of a screw 70 tapped through an opening in the end wall 71 of the casing C and provided with an external knob or finger piece 72 which may bear a suitable indication of the direction in which it is to be turned for raising or lowering the utilization pressure. This is best shown in Figure 4 wherein a corresponding finger piece, similarly designated, bears the words "lower" and "raise" in association with appropriate directional arrows.

In use the valve element of the organization O is opened to a suitable degree to provide for the flow of the gas from the container F. The valve element 49 of the valve V is normally in open position and the gas released from the container flows at an equal degree of pressure through the nipple 56 to the utilization point and through the passages 64 and 65 to the back pressure chamber 62.

In setting the valve for a particular utilization pressure the pressure of the gas in the back pressure chamber 62, as shown by the gage 68, will build up to a point where it exceeds the required utilization pressure and thereupon the screw 70 is turned in the direction of its inward movement, thereby to move the wall element 63 of the back pressure chamber toward the piston 59 and to increase the pressure stored in the spring 66 which always acts in coordination with the action of the opposing spring 52 bearing upon the opposite face of the piston 59. This adjustment of the pressure of the spring 66 of course reduces the pressure of the gas upon the piston 59 which is required for the closing movement of the valve and is completed when the pressure shown by the gage 68 corresponds to the predetermined degree of utilization pressure. When the screw 70 is backed off the power of the spring is reduced and the critical pressure of the gas in the chamber 62 is proportionately increased.

In the use of the gas the pressure at the utilization point will gradually exceed the predetermined pressure at such point and will build up in equal excessive degree in the back pressure chamber 62. When this occurs the combined pressure of the gas in the chamber 62 and of the spring 66 upon the piston 59 will overcome the combined pressure of the loading spring 52 and of the gas against the valve 49 and will thereby cause an inward or downward movement of the piston 59 with resultant closing of the valve 49 upon its seat 48 to cut off the supply of gas from the container F. Thereupon the pressure of the gas at the utilization point will fall below the pressure for which the valve V is set with the result of a corresponding reduction of the pressure of the gas in the back pressure chamber 62. When the pressure of the gas at the utilization point has fallen sufficiently below the predetermined regulated pressure the pressure of the gas against the valve 49 combined with the pressure of the loading spring 52 will overcome the combined pressure of the spring 66 and of the gas in the back pressure chamber 62, thereby to effect the movement of the piston 59 to open the valve 49 with the resultant delivery of the gas to the point of utilization. This cycle is of course repeated indefinitely throughout the period of use of the gas.

Referring to Figures 4 to 6:

The reducing and regulating valve is identical in construction and operation with the valve V as above described. The only difference between the constructions shown in Figures 1, 2 and 3 and in Figures 4 to 6 is that the valve V projects laterally in respect to the container F.

In the construction shown in Figures 4 to 6 the body 40 includes a mounting portion 40a having an axial direction normal to the axial direction of the valve V and coincident with the axis of the container F. The mounting portion 40a is formed with a passage 45a that corresponds functionally to the passage 45 in the construction previously described and communicates by a passage 46a, corresponding functionally to the passage 46 in the construction above described, with the inlet chamber 47. The mounting portion 40a is connected to the permanent valve element of the container F by an adapter 73 having an axial passage 74 which is a functional continuation of the passage 45a and is in communication with the passage 25 of the valve organization O.

It is obvious from the foregoing description that the valve of the invention can be assembled with great economy. Whenever replacement or substitution of valve parts, i. e., the sealing rings and the springs, may be needed all that is required is to remove the shell 44 from the body 40 whereupon complete access is had to all of the enclosed parts. Such replacement or renewal may be effected in a few minutes time and the valve may thereupon likewise within a few minutes time be readily reassembled.

In the foregoing specification and in the accompanying claims the relative positions of the sundry parts are distinguished as "inner" and "outer." These adjectives are used respectively to indicate positional locations in adjacency to or remoteness from the container F.

I claim:

1. A gas pressure reducing and regulating valve comprising, in combination: a body; a cylindrical shell removably attached to said body and coaxial therewith; the shell and the body constituting a valve casing and being the only parts of such casing, the shell having an end wall which is the outer end wall of the valve casing and the body providing the inner end wall of the valve casing; the body having an inlet passage and also having a cylindrical opening extending to its outer end, the opening extending from a base which overhangs the inlet passage and is provided with a passage in communication with the inlet passage and is also provided with an annular valve seat concentric with the axis of the valve casing; an axially movable valve cooperating with the valve seat; a stem which carries the valve and is mounted in said opening as a guide, the stem projecting beyond the outer end of said opening; the inner portion of the opening providing an inlet chamber; the inner portion of the stem being of reduced diameter and cooperating with the circular wall of the opening to define a clearance passage which forms a part of the inlet chamber; an outlet nipple carried by the casing and being in communication with the clearance passage, the outlet nipple projecting laterally from the casing; a piston fixed to the stem at its outer end and axially movable with the stem, the piston being of greater diameter than the valve carried by the stem; a compression type spring arranged between the piston and the body and reacting against the piston and the body, the spring urging the piston away from the body and the movement of the piston away from the body effecting a corresponding movement of the valve away from said seat; a back pressure chamber defined by the annular wall of the valve casing and by two relatively axially movable companion walls located in parallel planes, the inner of which is the piston and the outer of which is arranged between the piston and the outer end wall of the valve casing and is positionally adjustable in either axial direction in relation to the piston; a second compression type spring arranged in the back pressure chamber between the piston and its companion movable wall and which reacts against the piston and the companion movable wall, the second spring exerting pressure upon the piston in opposition to the spring first named; the stem being formed with a passage extending between the inlet chamber and the back pressure chamber through which gas flows to the back pressure chamber at the same time that it flows through the outlet nipple; the part of the casing located inwardly of the piston having a breather passage open to the interior of the casing and to atmosphere; a screw coaxial with the casing and tapped through its outer end wall, the screw bearing against the outer movable wall of the back pressure chamber in opposition to the spring arranged within the back pressure chamber, the screw having a head located externally of the casing and by means of which it may be turned to effect the positional adjustment of the outer wall of the back pressure chamber; sealing means cooperating with the stem and with the annular wall of said opening; sealing means cooperating with the piston and the inner annular face of the shell; and sealing means cooperating with the adjustably movable outer wall of the back pressure chamber and with the annular face of the shell; each of the sealing means being characterized by an annular channel and an O-ring fitting under compression in the channel and bearing with sealing effect against the base of the channel and the surrounding inner annular wall faces of the valve casing.

2. A pressure reducing and regulating valve as set forth in claim 1 wherein the body is formed with a countersunk recess to which the opening extends, the recess being of greater diameter than the opening, and the spring which urges the piston away from the body is mounted in the recess in surrounding relation to the stem.

References Cited in the file of this patent

UNITED STATES PATENTS

| 623,773 | Evans | Apr. 25, 1899 |
| 683,388 | Curtis | Sept. 24, 1901 |
| 1,795,201 | Dashwood | Mar. 3, 1931 |
| 2,563,192 | Scruggs | Aug. 7, 1951 |
| 2,640,332 | Keyes | June 2, 1953 |
| 2,700,983 | Bryant | Feb. 1, 1955 |